Patented June 13, 1939

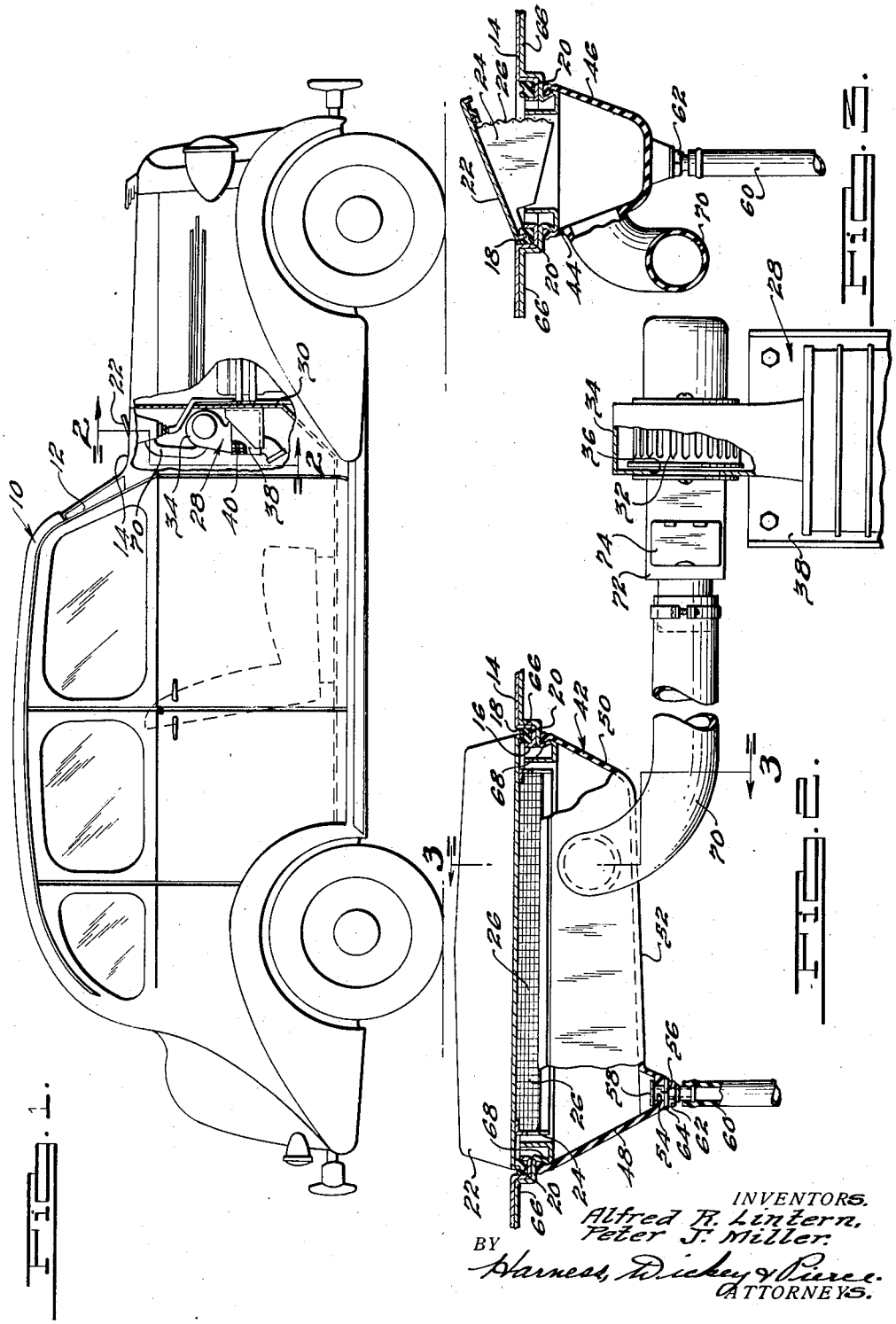

2,162,439

UNITED STATES PATENT OFFICE 2,162,439

VEHICLE VENTILATING AND HEATING APPARATUS

Alfred R. Lintern and Peter J. Miller, Detroit, Mich., assignors to Evans Products Company, Detroit, Mich., a corporation of Delaware Application March 26, 1937, Serial No. 133,171

6 Claims. (Cl. 98—2)

This invention relates to improved vehicle ventilating structure.

Objects of the present invention are to provide improved and simplified means for conducting fresh air into the interior of a vehicle body; to provide an improved structure for conducting fresh outside air to and through a heater for discharge into the interior of a vehicle body which includes a flexible member in association with the air inlet opening which may be readily removed during periods in which heating of the air is not necessary or desired; to provide an all weather ventilating structure associated with the cowl opening of a vehicle whereby fresh air may be drawn through the cowl openings into an air conduit and discharged therefrom into the interior of a passenger vehicle without carrying therewith any foreign material such as water, dust, or the like; and to provide a ventilating structure which is economical to manufacture and readily installed and removed.

Other objects of the invention will become apparent from the following specification, the drawing relating thereto, and from the claims hereinafter set forth.

In the drawing in which like numerals are used to designate like parts in the several views throughout:

Figure 1 is a side elevational view of a vehicle with parts broken away embodying features of the present invention;

Figure 2 is a partial elevational view with parts broken away showing parts in section taken substantially along the line 2—2 of Figure 1; and Figure 3 is a cross-sectional view showing parts in elevation taken substantially on the line 3—3 of Figure 2.

According to the present invention fresh outside air is drawn into the vehicle through a conventional cowl ventilating opening and is discharged into the passenger compartment of the vehicle either directly from a conduit communicating with the cowl opening or from a heater through which the fresh air is passed. To provide a simplified structure for conducting the outside air into the interior of the vehicle and to the heater a flexible bag-like member of resilient material, such as rubber or the like, is mounted within the vehicle body in surrounding relation to the cowl opening. Means are provided under the cowl opening for removable engagement with the flexible bag-like member, so that the flexible member may be readily attached to the vehicle body and may be readily removed therefrom when and if desired. A conduit is provided which communicates with the flexible bag-like member and also communicates with the interior of the vehicle and with the heater and which communicates with the bag-like member in such a position that foreign material, such as water, does not pass into the interior of the vehicle. A drain opening is provided through the bag-like member below the location at which the conduit communicates with the interior of the bag-like member so that any water collected within the bag-like member may be readily drained therefrom.

For a better understanding of the invention reference may be had to the drawing in which a conventional vehicle 10 is illustrated having a front windshield 12 and a cowl 14. An opening is provided through the cowl 14 to provide the usual cowl opening; and the edges of the cowl 14 defining the opening 16 are preferably bent so as to provide an upwardly directed channel 18 therearound within which resilient strips 20 are secured for the purpose of effectively sealing the cowl opening when the cowl shutter 22 is in its closed position.

The cowl shutter 22 is pivoted along its rear edge in the usual way and is provided with the usual means for adjustably opening and closing the shutter. The closure or shutter 22 is preferably provided with downwardly directed flanges around its edges which engage the resilient members 22 for effectively sealing the cowl opening. The shutter 22 may be operated in the usual way to control the volume of air passing through the cowl opening.

The cowl shutter 22 is also preferably provided with vertical plate members 24 adjacent the sides thereof which are received within the opening 16 and move therein as the shutter 22 is moved. A screen 26 is secured to the front edges of the side members 24 for preventing the passage of large pieces of foreign material through the cowl opening.

A blower and heating unit generally indicated at 28 is suitably mounted to the dash board 30 of the vehicle within the passenger compartment. The particular structure of the blower and heating unit per se forms no part of the present invention, and for the purpose of illustration the blower and heating unit 28 is illustrated as including a centrifugal blower 32 mounted within a housing 34. The housing 34 is provided with an inlet opening 36 wihch communicates with the cowl opening through a conduit, to be described in detail hereinafter, and is also provided with a downwardly directed discharge opening which communicates with a heater 38 for passing the air into the heater past a heating core 40 and discharging the heated air into the interior of the vehicle in the usual way.

To provide a connection between the inlet 36 of the housing 34, the interior of the vehicle and the cowl opening, according to the present invention an air confining structure is provided which includes a flexible bag-like member 42 of resilient material such as rubber or the like. The flexible bag-like member 42 may be moulded with side walls 44 and 46, end walls 48 and 50, and a bottom wall 52. The walls and bottom of the member 42 are preferably sloped so as to assist in the drainage of any water or the like collected within the bag-like member, and a drain opening 54 is provided through the bottom 52 preferably at its lowermost point.

A rigid fitting member 56 including a short tubular portion having a flange 58 at its upper end is mounted within the opening 54 and extends downwardly therethrough for removable connection with an elongated flexible tubular member 60. The tubular member 60 may be extended to any desired location for discharging water or the like drained through the tubular element 56. The tubular element 56 may be secured in position relative to the opening 54 by means of a nut 62 and washer 64 which prevent leakage into the vehicle around the tubular element 56.

In order to removably mount the flexible bag-like member 42 to the vehicle body in surrounding relation to the cowl opening, a panel member 66 is provided and secured to the under surface of the cowl adjacent the edges of the cowl opening. The member 66 has an opening therethrough in alignment with the cowl opening 18 and the edges of the member 66 adjacent the opening are bent and flanged to form outwardly directed shoulders 68 for engagement with the upper edge of the bag-like member 42. For mounting the bag-like member 42 to the vehicle body adjacent the cowl opening by means of the member 66 the upper edges of the member 42 may be stretched and placed in embracing relation to the shoulder portion 68 of the channel member 66. Upon release the flexible upper edges of the member 42 clamp against the shoulder 68 and resiliently and securely hold the bag member 42 in its position relative to the cowl opening.

For communicating the interior of the bag-like member 42 with the interior of the vehicle and with the inlet 36 of the housing 34, a flexible tubular member 70 is provided which is in communication at one end with the interior of the bag member 42 through an opening in one of the side walls 44 or 46 above the drain outlet. The tubular element 70 may be suitably secured to the member 42 so as to provide a sealed joint therebetween and prevent the direct escape of any air from within the member 42.

The other end of the tubular member 70 is connected to one end of an elongated conduit member 72 which in turn is in communication at its other end with the inlet side of blower 32. An opening directly into the interior of the vehicle is also preferably provided in the member 72 and is provided with a door or shutter 74 for adjustably controlling the volume of air passed through the opening.

In operation, the cowl shutter 22 is opened to the position desired, and air enters through the cowl opening into the space defined by the flexible bag-like member 42, and passes therefrom into the flexible conduit 70. As the vehicle moves forwardly, air is caused to pass through the cowl opening due to the forward movement of the vehicle and to pass into the conduit 70. When the blower 32 is not in operation the air will pass directly into the vehicle, past the shutter 74. However, when the blower 32 is in operation, the air will be discharged into the vehicle body through the heater and will be recirculated from within the body through the shutter 74. It is evident that if the vehicle is moving forwardly at a relatively high rate of speed, the velocity of the air through the conduit 70 will also be relatively high so that under such conditions air may enter the vehicle through the shutter 74 as well as through the heater outlet. For normal operations of normal vehicle speeds, by controlling the position of the shutter 22 and the shutter 74, and by operating the blower 32 the relative proportions of re-circulated and fresh outside air discharged into the passenger compartment may be effectively controlled.

From the above, it is evident that applicant has provided an improved structure for conducting fresh air into the passenger compartment of a vehicle and has further provided a simplified structure which may be conveniently removed and replaced from its fixed position on the vehicle.

Formal changes may be made in the specific embodiment of the invention described without departing from the spirit and substance of the invention, the scope of which is commensurate with the appended claims.

What is claimed is:

1. In a vehicle provided with a downwardly directed air inlet opening, a flexible bag-like member of resilient material within said body mounted in surrounding relation to said inlet opening, and an air conduit connected to said member and communicating with the interior of said vehicle for discharging air passed through said inlet opening into the interior of said vehicle.

2. In a vehicle having a cowl ventilating opening, a flexible bag-like member of resilient material within said body mounted in surrounding relation to said inlet opening, means for drawing air through said cowl opening into said member and discharging it into the interior of said vehicle, said last named means including a conduit connected to said member, means forming a drain opening in the bottom of said member, and said conduit communicating with said member above said drain opening.

3. In a vehicle having a cowl ventilating opening, a flexible bag-like member of resilient material within said body mounted in surrounding relation to said cowl opening, means for drawing air through said cowl opening into said member heating the air and discharging it into the interior of said vehicle, said last named means including a blower, a housing therefor, and a heat interchanger, and an air conduit connected to said member and to said housing.

4. In a vehicle provided with a cowl ventilating opening, a flexible bag-like member of resilient material within said body removably mounted in surrounding relation to said opening, said bag-like member having a sloping bottom and upstanding side walls, an air conduit connected to said member and communicating with the interior of said vehicle for discharging air passed through said cowl opening into the interior of the vehicle, means forming a drain opening through the bottom of said member, and said conduit communicating with said member through one of said side walls.

5. In a vehicle provided with a cowl ventilating opening, an adjustable closure for said cowl opening, a member having outwardly directed shoulders thereon mounted in surrounding relation to said cowl opening providing an opening therethrough in alignment with said cowl opening, a flexible bag-like member of resilient material within said body mounted in surrounding relation to said inlet opening in removable engagement with said shoulders, said bag-like member having upstanding side walls, and an air conduit connected to said member through one of said side walls and communicating with the interior of said vehicle for discharging air passed through said cowl opening into the interior of said vehicle.

6. In a vehicle provided with a cowl ventilating opening, a flexible bag-like member of rubber within said body mounted in surrounding relation to said inlet opening, means forming a drain opening through the bottom of said member, a conduit communicating with the interior of said member above said drain opening for discharging air passed through said inlet opening into the interior of said vehicle.

ALFRED R. LINTERN.
PETER J. MILLER.